US012684381B2

(12) United States Patent
Cao et al.

(10) Patent No.: US 12,684,381 B2
(45) Date of Patent: Jul. 14, 2026

(54) SYSTEMS AND METHODS FOR BEAM INDICATION IN MULTI-BEAM CELL

(71) Applicant: ZTE CORPORATION, Shenzhen (CN)

(72) Inventors: Wei Cao, Shenzhen (CN); Nan Zhang, Shenzhen (CN); Linxi Hu, Shenzhen (CN); Zhen Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 441 days.

(21) Appl. No.: 18/153,216

(22) Filed: Jan. 11, 2023

(65) Prior Publication Data
US 2023/0217285 A1 Jul. 6, 2023

Related U.S. Application Data

(63) Continuation of application No. PCT/CN2020/103230, filed on Jul. 21, 2020.

(51) Int. Cl.
*H04W 24/08* (2009.01)
*H04L 5/00* (2006.01)

(52) U.S. Cl.
CPC ............. *H04W 24/08* (2013.01); *H04L 5/005* (2013.01)

(58) Field of Classification Search
CPC ...... H04W 24/08; H04L 5/005; H04L 5/0053; H04L 5/0017
See application file for complete search history.

(56) References Cited

U.S. PATENT DOCUMENTS

| | | | |
|---|---|---|---|
| 5,509,063 A | | 4/1996 | Crabtree et al. |
| 2012/0307726 A1* | | 12/2012 | Pi ......................... H04J 11/0069 |
| | | | 370/328 |
| 2014/0086217 A1 | | 3/2014 | Park et al. |
| 2015/0078348 A1 | | 3/2015 | Han et al. |
| 2015/0280802 A1 | | 10/2015 | Thomas et al. |
| 2018/0131491 A1 | | 5/2018 | Xiong et al. |
| 2018/0220426 A1 | | 8/2018 | Rico Alvarino et al. |
| 2018/0343571 A1 | | 11/2018 | Kim et al. |

(Continued)

FOREIGN PATENT DOCUMENTS

| | | |
|---|---|---|
| CN | 102056309 A | 5/2011 |
| CN | 103782636 A | 5/2014 |

(Continued)

OTHER PUBLICATIONS

Extended European Search Report on EP 20946515.2 dated Jul. 5, 2023 (10 pages).

(Continued)

*Primary Examiner* — Jackie Zuniga Abad
(74) *Attorney, Agent, or Firm* — Foley & Lardner LLP

(57) ABSTRACT
Systems and methods for wireless communications are disclosed herein. In some embodiments, a wireless communication method includes applying, by a base station, code sequences or scrambling codes to repetitions of broadcast information of a plurality of resources of a cell of the base station. Each of the code sequence or the scrambling codes being specific to a corresponding one of the plurality of resources. Each of the plurality of resources is a beam of the cell. In addition, the base station transmits, to a wireless communication device, the repetitions of the broadcast information with the code sequences or the scrambling codes applied.

19 Claims, 6 Drawing Sheets

(56) References Cited

U.S. PATENT DOCUMENTS

| | | | | |
|---|---|---|---|---|
| 2019/0246420 A1* | 8/2019 | Park | .................... | H04W 76/28 |
| 2019/0335426 A1 | 10/2019 | Kim et al. | | |
| 2020/0127786 A1* | 4/2020 | Kwak | .................. | H04L 27/261 |
| 2021/0320833 A1* | 10/2021 | Kim | .................. | H04L 27/2657 |

FOREIGN PATENT DOCUMENTS

| | | |
|---|---|---|
| CN | 107439047 A | 12/2017 |
| CN | 108781399 A | 11/2018 |
| CN | 110192368 A | 8/2019 |
| CN | 110999448 A | 4/2020 |
| CN | 110999500 A | 4/2020 |
| CN | 111034331 A | 4/2020 |
| KR | 1020140043532 A | 4/2014 |
| WO | WO-2017/114516 A1 | 7/2017 |

OTHER PUBLICATIONS

5GNRAS; Zhang, Xiaojian, https://blog.csdn.net/m0_45416816/article/details/103807853, 5GNRPDSCH DM-RS, Jan. 2, 2020 (8 pages).

First Office Action for CN Appl. No. 202080104826.6, dated Apr. 11, 2024 (with English translation, 16 pages).

NTT DOCOMO, Inc., "SR on NR-WID", 3GPP TSG RAN meeting #77, RP-171783, Sep. 14, 2017, Sapporo, Japan (284 pages).

Zhou, Z., "Study on Sequences with Low Correlation and Their Related Codes", China Master's Theses Full-text Database, Oct. 15, 2010 (3 pages).

Fujitsu: "NR-PBCH design" 3GPP TSG RAN WG1 Meeting #89; R1-1707253; Apr. 19, 2017; Hangzhou, China (10 pages).

International Search Report and Written Opinion for PCT Appl. No. PCT/CN2020/103230, mailed Apr. 20, 2021 (9 pages).

Office Action for KR 10-2023-7002184 dated Apr. 21, 2025 (7 pages).

* cited by examiner

| Beam Index | Beam-Specific OCC | | | | | | | |
|------------|-------------------|-----|-----|-----|-----|-----|-----|-----|
| 0 | 1 | 1 | 1 | 1 | 1 | 1 | 1 | 1 |
| 1 | 1 | -1 | 1 | -1 | 1 | -1 | 1 | -1 |
| 2 | 1 | 1 | -1 | -1 | 1 | 1 | -1 | -1 |
| 3 | 1 | -1 | -1 | 1 | 1 | -1 | -1 | 1 |
| 4 | 1 | 1 | 1 | 1 | -1 | -1 | -1 | -1 |
| 5 | 1 | -1 | 1 | -1 | -1 | 1 | -1 | 1 |
| 6 | 1 | 1 | -1 | -1 | -1 | -1 | 1 | 1 |

Length-7 OCC 410

401  402  403  404  405  406  407  408

80-ms sub-period 400

501

500

510
511
512
513

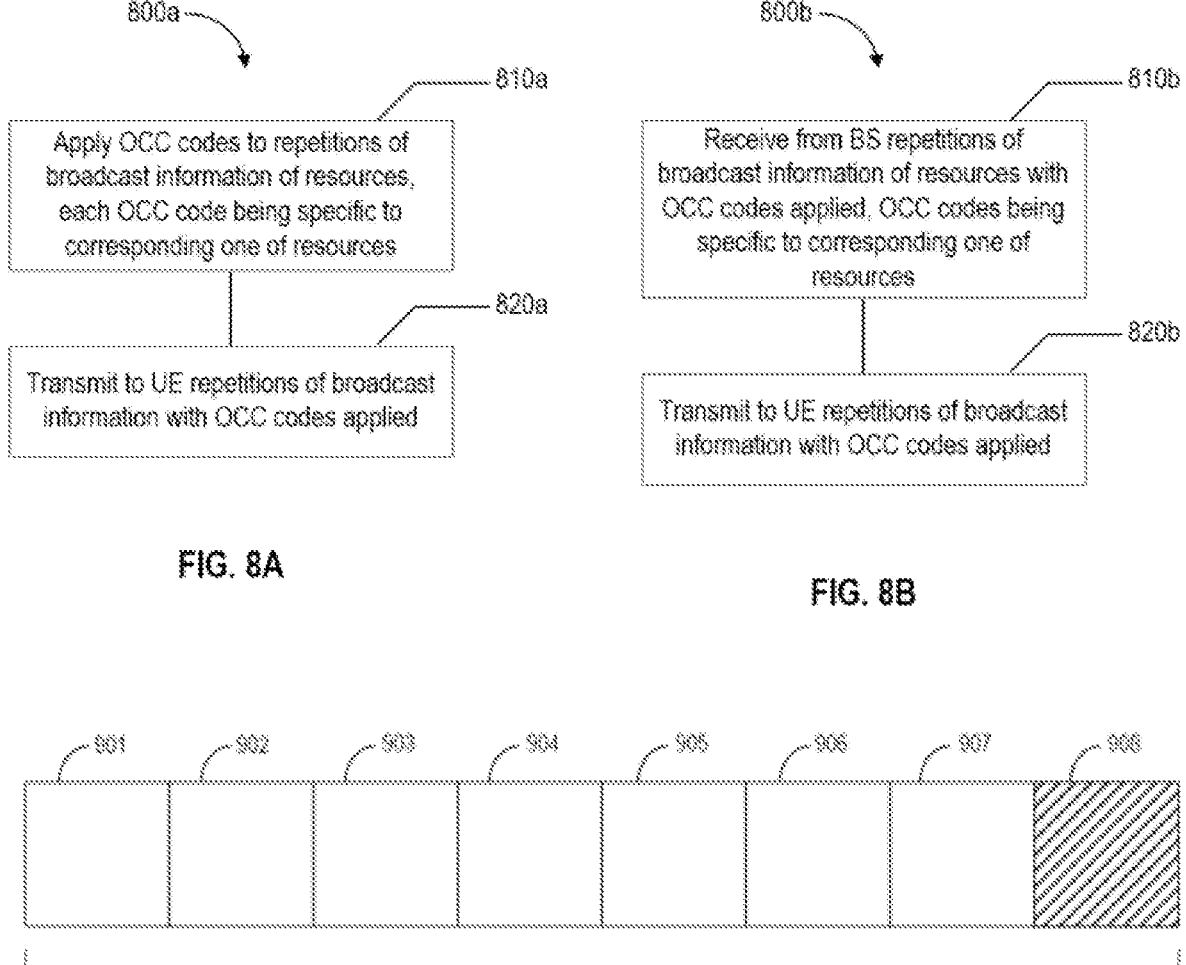

800a —

810a

Apply OCC codes to repetitions of broadcast information of resources, each OCC code being specific to corresponding one of resources 820a Transmit to UE repetitions of broadcast information with OCC codes applied

Receive from BS repetitions of broadcast information of resources with OCC codes applied, OCC codes being specific to corresponding one of resources 820b Transmit to UE repetitions of broadcast information with OCC codes applied

80-ms sub-period 900

FIG. 9

SYSTEMS AND METHODS FOR BEAM INDICATION IN MULTI-BEAM CELL

CROSS-REFERENCE TO RELATED APPLICATION

This application claims the benefit of priority under 35 U.S.C. § 120 as a continuation of PCT Patent Application No. PCT/CN2020/103230, filed on Jul. 21, 2020, the disclosure of which is incorporated herein by reference in its entirety.

TECHNICAL FIELD

The present disclosure relates to the field of telecommunications, and in particular, to beam-specific indication in a multi-beam cell.

BACKGROUND

To expand the utilization and coverage of radio access technologies such as but not limited to Long-Term-Evolution (LTE) technologies and New Radio (NR) technologies, connectivity provided by satellites and airborne vehicles has been considered as a promising application. A network incorporating satellites and/or airborne vehicles to perform the functions (either full or partial) of terrestrial Base Stations (BSs) is called a Non-Terrestrial Network (NTN). Satellites and airborne vehicles are collectively referred to as non-terrestrial BSs. Examples of satellites include but are not limited to, Low Earth Orbit (LEO) satellites, and so on. Examples of airborne vehicles include but are not limited to, High-Altitude Platform Stations (HAPS), balloons, Unmanned Aerial Vehicles (UAVs), other suitable airborne vehicles, and so on.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some arrangements, a BS applies code sequences (e.g., Orthogonal Code Cover (OCC)) codes to repetitions of broadcast information of a plurality of resources of a cell of the BS. Each of the OCC codes is specific to a corresponding one of the plurality of resources. Each of the plurality of resources is a beam of the cell. The BS transmits to a User Equipment (UE) the repetitions of the broadcast information with the OCC codes applied.

In some arrangements, a UE receives from a BS repetitions of broadcast information of a plurality of resources of a cell of the BS with code sequences (e.g., OCC codes) applied. Each of the OCC codes is specific to a corresponding one of the plurality of resources. Each of the plurality of resources is a beam of the cell. The UE determines measurements for each of the plurality of resources distinguished using the OCC codes.

In some arrangements, a BS applies scrambling sequences to broadcast information of a plurality of resources of a cell of the BS. Each of the scrambling sequences is specific to a resource of the plurality of resources. Each of the plurality of resources is a beam of the cell. The BS transmits to a UE the broadcast information with the scrambling sequences applied.

In some arrangements, a UE determines scrambling sequences. Each of the scrambling sequences is specific to a resource of a plurality of resources of a cell of a BS. Each of the plurality of resources is a beam of the cell. The UE determines a serving resource using the scrambling sequences.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 8A is a flowchart diagram illustrating an example wireless communication method for indicating beam-specific broadcast information, according to various arrangements.

FIG. 8B is a flowchart diagram illustrating an example wireless communication method for indicating beam-specific broadcast information, according to various arrangements.

FIG. 9, which is a diagram illustrating an application of cell-and-beam-specific scrambling code initialization values in a sub-period, according to various arrangements.

DETAILED DESCRIPTION OF EXAMPLE EMBODIMENTS

Figure 1:
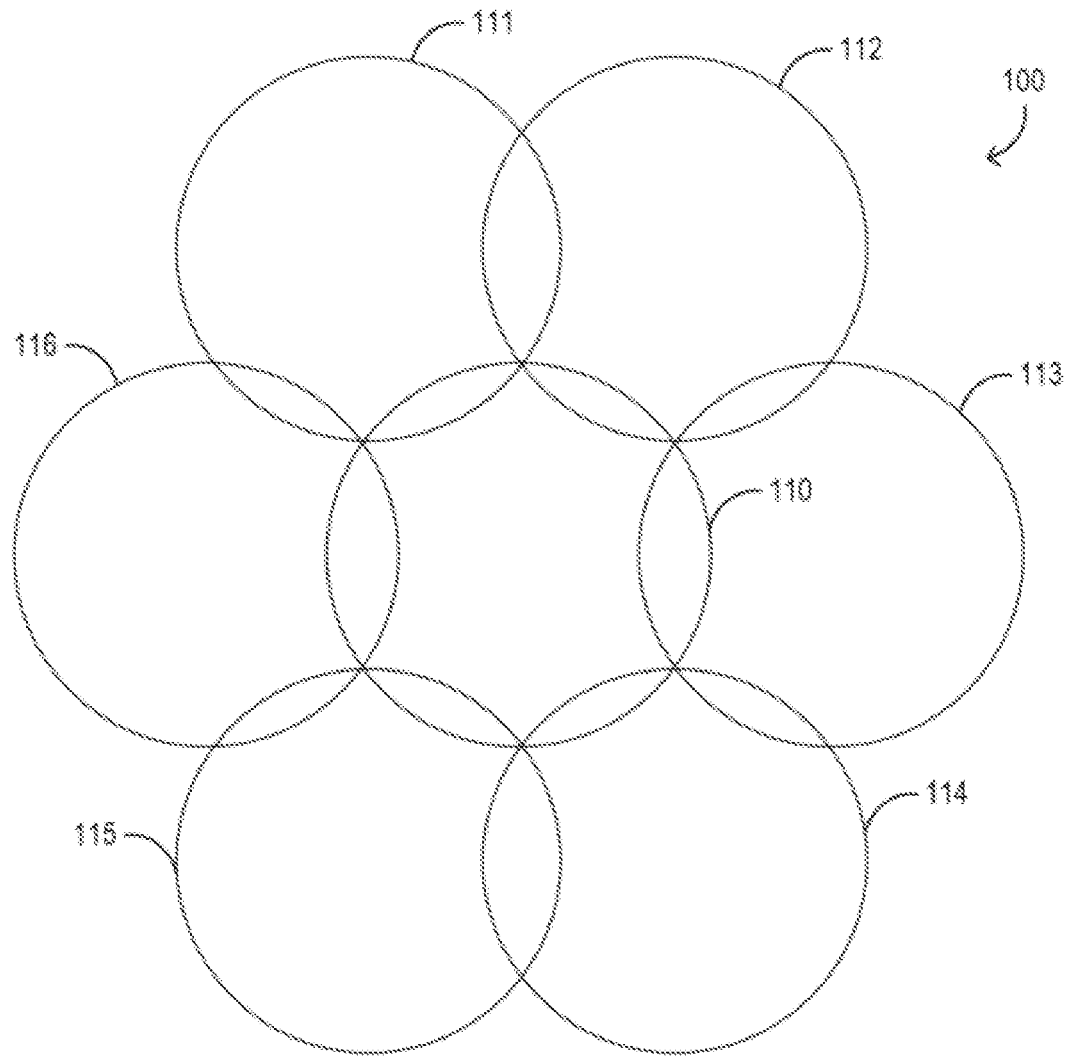
FIG. 1 is diagram illustrating beams of a cell of a BS in a wireless communication system, according to various arrangements.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In NTNs, the coverage of a satellite or an airborne vehicle is generally implemented using multiple beams. For example, the beams of a satellite can sweep across a coverage area as the satellite moves along its orbit. A User Equipment (UE) that is fixed or relatively fixed on the ground is served by different beams of the satellite over time, as the satellite moves. The coverage area of a satellite can be large, e.g., with a single satellite beam footprint diameter of hundreds of kilometers. The number of UEs within the satellite's coverage is likewise expected to be large. Therefore, the large number of UEs have to change serving beams with the movement of the satellite. This is also true for airborne vehicles, which can move while providing network coverage.

Considering signaling cost saving, beam switching is more preferable over cell switching. On one hand, a UE identifies and measures its serving beam and neighboring beams to facilitate beam switching. One the other hand, cell-level synchronization/broadcast signals of multiple beams generally occupy a same frequency resource to ease downlink synchronization at the UE side. The cell-level synchronization/broadcast signals of different beams can be multiplexed in time domain, for example, via multiple Synchronization Signal Blocks (SSBs) in the time domain for beam measurement, where each SSB corresponds to one of the beams. Such time-domain beam-level multiplexing needs longer synchronization period at the UE side and thus higher power consumption.

For a cell with multiple beams, cell-level synchronization/broadcast signals of the multiple beams generally occupy a same frequency resource to ease downlink synchronization at the UE side. In conventional NR deployment, the cell-level Primary Synchronization Signal (PSS), Secondary Synchronization Signal (SSS), and PBCH of different beams can be multiplexed in time domain. Such design is not well-suited for the NTN because different beams of a non-terrestrial BS in NTN generally cover different areas, have large coverage areas, and have less overlap. Accordingly, arrangements disclosed herein are directed to simultaneous PSS, SSS, and PBCH transmissions in multiple beams to achieve time-efficient and energy efficient synchronization.

The concept of beams has not be implemented for conventional Narrow Band (NB) Internet-of-Things (IoT). In NB IoT, cell-level PSS, SSS, and PBCH are transmitted on an anchor carrier only. A UE cannot determine or otherwise identify the beam on which the UE resides from the received PSS, SSS, and/or PBCH. Thus, the UE cannot perform neighboring carrier measurement. Such design is also not well-suited for the NTN scenario because beam-level frequency pre-compensation at BS cannot be performed at all.

In some examples, PBCH is transmitted with a period (e.g., having a length of 640 ms). Each period includes a number (e.g., 8) of sub-periods. In the example in which the period is 640 ms long and has 8 sub-periods, each sub-period has a length of 80 ms. In each sub-period, an identical PBCH (e.g., having a length of 1 ms) is transmitted in subframe #0 of each frame.

The arrangements disclosed herein relate to systems, methods, and non-transitory computer-readable media for energy-efficient and time-efficient beam indication. In some implementations, the beam indication methods include using an Orthogonal Code Cover (OCC) in Physical Broadcast Channel (PBCH) repetition, which provides beam indication. In some implementations, the beam indication methods include applying scrambling sequences corresponding to each beam in PBCH repetition to provide beam indication.

In some embodiments, a beam can be regarded as a physical resource. Abeam can be represented or defined by one or more of 1) a reference signal ID, 2) reference signal association (e.g., Quasi-Co-Located (QCL), 3) a polarization pattern, 4) a physical resource ID such as but not limited to, a resource including a frequency resource, e.g., a Bandwidth Part (BWP), carrier(s), and so on; a spatial resource, including but not limited to, an antenna port (e.g., sharing a same port or within an antenna port group); a Code Division Multiplex (CDM) group, e.g., CDM Demodulation Reference Signal (DM-RS), or 5) a logic ID, which can be defined by the association between some implementation based arrangement, e.g., area ID/tracking area ID, which is based on the location.

FIG. 1 is diagram illustrating beams of a cell 100 of a BS in a wireless communication system, according to various arrangements. Referring to FIG. 1, the BS can be a non-terrestrial BS such as but not limited to, a satellite or an airborne vehicle. The BS shown in the example in FIG. 1 provides multiple beams, including beams 110, 111, 112, 113, 114, 115, and 116. Each of the beams 110-116 forms a coverage area. The UE can transmit data to and receive data from the BS via one of the beams 110-116 while the UE is within the coverage area of that beam. The beams 110-116 (and the coverage areas thereof) collectively form the cell 100.

In some examples, frequency reuse can be implemented to improve energy efficiency of the beams 110-116. In frequency reuse, two or more different beams can transmit and/or receive data using a same frequency resource or a same frequency band. For example, the beam 110 can use a first frequency resource or a first frequency band. The beams 111 and 114 can use a second frequency resource or a second frequency band. The beams 112 and 115 can use a third frequency resource or a third frequency band. The beams 113 and 116 can use a fourth frequency resource or a fourth frequency band. The first, second, third, and fourth frequency resources are different frequency resources. The first, second, third, and fourth frequency bands are different frequency bands. A fixed or relatively fixed UE can be served by different beams (with different frequency resources) of the same non-terrestrial BS over time, as the non-terrestrial BS moves. To save signaling cost in mobility management, a non-terrestrial BS (e.g., a cell) with multiple beams is preferred.

Figures 2, 3:
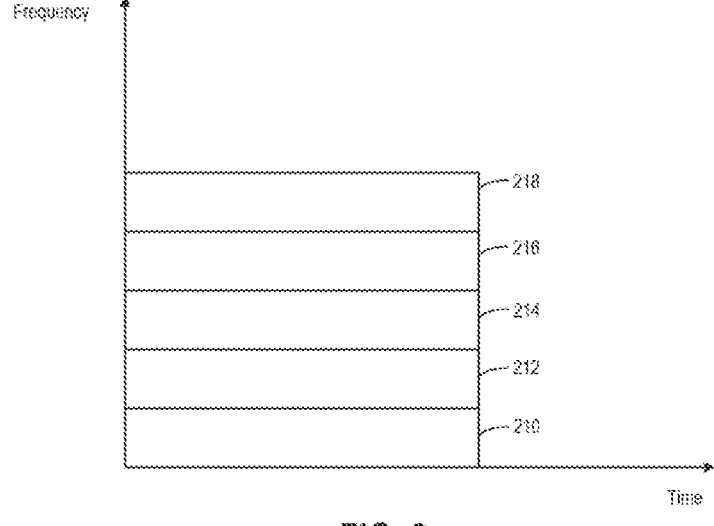
FIG. 2 is a diagram illustrating frequency resources used by the beams of the cell (FIG. 1), according to various arrangements.
FIG. 3 is a table illustrating a Hadamard code for each beam, according to various arrangements.

FIG. 2 is a diagram illustrating frequency resources used by the beams 110-116 of the cell 100 (FIG. 1), according to various arrangements. Referring to FIGS. 1-2, the frequency resources used by the beams 110-116 are shown on a diagram in which the y-axis corresponds to frequency and the x-axis corresponds to time. The frequency resources include frequency resources 210, 212, 214, 216, and 218. Each of the frequency resources 210, 212, 214, 216, and 218 corresponds to a frequency bandwidth or a Bandwidth Part (BWP). The non-terrestrial BS transmits PBCHs of all of the beams 110-116 using a common frequency resource, e.g., the frequency resource 210. The beam 110 uses (is transmitted) the frequency resource 212. The beams 111 and 114 use (are transmitted on) the frequency resource 214. The beams 112 and 115 use (are transmitted on) the frequency resource 216. The beams 113 and 116 use (are transmitted on) the frequency resource 218.

In a NTN, PSS, SSS, and PBCH repetition can reduce large path loss. To facilitate beam identification, the arrangements disclosed herein can employ OCC in performing PBCH repetition. In particular, PBCH repetition is performed with beam-specific OCCs. PBCH is a broadcast channel through which a BS (e.g., a non-terrestrial BS) broadcasts information (e.g., configurations and parameters) for a control channel and a share channel corresponding thereto.

In some examples, the non-terrestrial BS transmits PBCH with a period having a length (e.g., 640 ms). Each period includes a number of sub-periods. In the example in which the period is 640 ms long and has 8 sub-periods, each sub-period has a length of 80 ms. In each sub-period, an identical PBCH (e.g., having a length of 1 ms) is transmitted in a particular subframe (e.g., subframe #0) of each radio frame. In some examples, an OCC code with a length no more than the number of consecutive identical PBCH subframes can be applied to distinguish beams.

In some arrangements, given that all beams (e.g., the beams 110-116) share the same cell-level PBCH and the same frequency resource (e.g., the frequency resources 210), a resource-specific (e.g., a beam-specific) OCC can be added to a series of 1-ms PBCH to distinguish beams. An example of the OCC can be a Hadamard code. FIG. 3 is a table illustrating a Hadamard code for each of the beams 110-116 (FIG. 1), according to various arrangements. Referring to FIGS. 1-3, the Hadamard code has a length of 8 and is used to distinguish the 7 beams 110-116. As shown, a beam (e.g., the beam 110) having a beam index 0 corresponds to the beam-specific OCC [1 1 1 1 1 1 1 1], a beam (e.g., the beam 111) having a beam index 1 corresponds to the beam-specific OCC [1 –1 1 –1 1 –1 1 –1], . . . , a beam (e.g., the beam 116) having a beam index 6 corresponds to the beam-specific OCC [1 1 –1 –1 –1 –1 1 1]. While the Hadamard code is shown as an example of the OCC code, other orthogonal codes (e.g., a Zadoff-Chu (ZC) sequence set, and so on) can be likewise implemented.

Each element of a beam-specific OCC is multiplied to a 1-ms PBCH subframe. In a NTN, Line-of-Sight (LOS)

probability is generally high due the NTN is deployed in an outdoor environment. Thus, the channel or communication link between a non-terrestrial BS and a UE is expected to be stable over time, if the Doppler pre-compensation or post-compensation is taken into account. In other words, the channel can be assumed to be stable.

The UE, in response to receiving the consecutive identical 1-ms PBCHs (each in a subframe of a frame of a sub-period), combines the consecutive identical 1-ms PBCHs with all possible beam-specific OCCs. For example, the UE can combine the 8 consecutive identical 1-ms PBCH sub-frames with each beam-specific OCC corresponding to beam indexes 0-6 shown in FIG. 3 through multiplication. In one example, a first-received PBCH (of the 8 identical PBCHs, in the earlier sub-period) is multiplied with a first element of a beam-specific OCC (e.g., 1 for beam-specific OCC corresponding to beam index 1), a second-received PBCH (of the 8 identical PBCHs, in the second earliest sub-period) is multiplied with a second element of the beam-specific OCC (e.g., –1 for beam-specific OCC corresponding to beam index 1), . . . , and a last-received PBCH (of the 8 identical PBCHs in the last sub-period) is multiplied with a last element of the beam-specific OCC (e.g., –1 for beam-specific OCC corresponding to beam index 1). The repetitions of the PBCH are likewise multiplied with the elements of the OCCs corresponding to each of beam indexes 0 and 2-6.

The resultant measurement corresponding to each beam-specific OCC (e.g., the resulting RSRP of each beam as measured, if higher than a detectable threshold), is used by the UE to determine a serving beam and one or more neighboring beams. The resultant measurement can be reported to the non-terrestrial BS to facilitate possible beam switching. In some examples, the number of neighboring beams to be reported can be indicated by the non-terrestrial BS via UE-specific signaling, UE group signaling, or broadcast. The UE can report the measurements of the number of neighboring beams to the non-terrestrial BS In some arrangements, a length of the beam-specific OCC (referred to as N) can be determined according to a number of neighboring beams to be measured. In the example shown in FIG. 1 in which 7 total beams and 6 neighboring beams are deployed, N needs to be sufficiently large (e.g., 8, which is $2^3$) for distinguishing the different beams without creating waste (e.g., 16, which is $2^4$ would be too large to cover 6 neighboring beams). The number of neighboring beams to be measured can be set according to practical deployment configurations. In other words, the number of neighboring beams to be measured can be predefined. The non-terrestrial BS can indicate or information the value of N to the UEs via PBCH. Given that the OCC combination over the consecutive identical PBCH subframes depends on successful decoding of the PBCH subframes, the value of N can be available after successful decoding of a single PBCH sub-frame. The OCC codes or the generation method thereof can be predefined and known by the non-terrestrial BS and UEs in advance. Accordingly, in response to determining the length (N) of the beam-specific OCC by decoding a single PBCH subframe, the UE can generate the OCC codes having the length N according to any suitable predetermined or predefined method (corresponding to a given type of the OCC codes such as the Hadamard code, ZC sequence set, and so on).

In some arrangements, the OCC code is a ZC sequence set. An example ZC sequence set can be a length-7 ZC root sequence $x_u$, which can be generated using expression (1):

$$x_u(n) = \exp\left(-j\frac{\pi u n(n+1)}{N_{ZC}}\right); \tag{1}$$

where n=0 . . . $N_{ZC}$−1, $N_{ZC}$=7. $N_{ZC}$ is the length of the ZC sequence set, which is 7 in this case. The ZC root u can be cell-specific. For example, the ZC root u can be determined using expression (2):

$$u = \mathrm{mod}\left(N_{ID}^{cell}, N_{ZC}\right) + 1; \tag{2}$$

where $$N_{ID}^{cell}$$

is a cell identifier. Each beam of the same cell has a beam-specific cyclic shift $C_{beam_{ID}}$. For example, the beam-specific cyclic shift $C_{beam_{ID}}$ can be determined using expression (3):

$$C_{beam_{ID}} = \mathrm{mod}(beam_{ID}, N_{ZC}). \tag{3}$$

Accordingly, an example of the beam-specific OCC code can be the ZC root sequence shown in expression (4):

$$x_{u,beam_{ID}}(n) = x_u\left((n + C_{beam_{ID}})\mathrm{mod}N_{ZC}\right). \tag{4}$$

Figure 4:
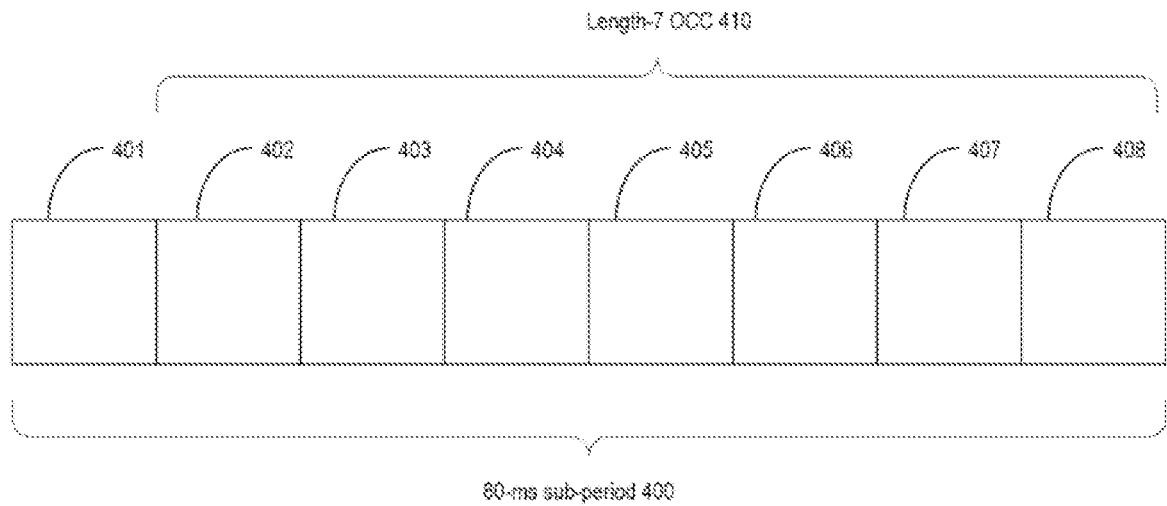
FIG. 4 is a diagram illustrating an application of an OCC in a sub-period, according to various arrangements.

In some examples, only part of the 1-ms PBCH in a 80-ms sub-period has the OCC applied. FIG. 4 is a diagram illustrating an application of an OCC (e.g., a length-7 OCC 410) in a sub-period 400, according to various arrangements. Referring to FIGS. 1-4, an example of the length-7 OCC 410 is a length-7 ZC root sequence. The sub-period 400 includes 8 frames (frames 401, 402, 403, 404, 405, 406, 407, and 408) of 10 ms each. Each frame includes 10 subframes of 1 ms. In the sub-period 400, an identical PBCH (e.g., having a length of 1 ms) is transmitted in subframe #0 of each of the frame 401-408. As shown, the length-7 OCC 410 is applied to the identical PBCH repetitions in frames 402, 403, 404, 405, 406, 407, and 408, but not the frame 401.

Figure 5:
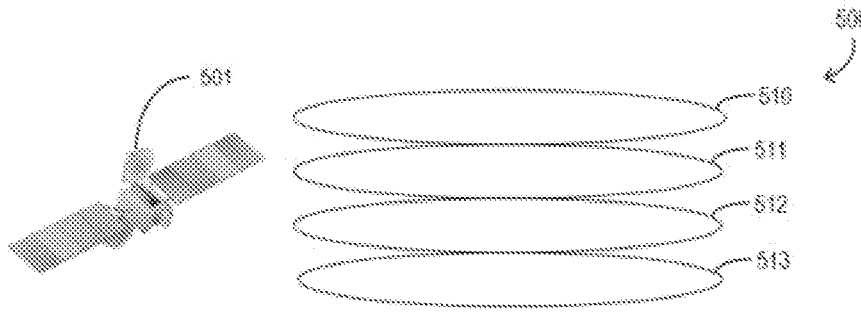
FIG. 5 is a diagram illustrating an example satellite communication beam deployment, according to various arrangements.

In some satellite communication systems, the beam deployment may be different from conventional terrestrial networks. FIG. 5 is a diagram illustrating an example satellite communication beam deployment, according to various arrangements. Referring to FIG. 5, a satellite 501 can provide band-shaped beams 510, 511, 512, and 513. Each of the beams 510-513 forms a coverage area. UEs can transmit data to and receive data from the satellite 501 via one of the beams 510-513 while the UE is within the coverage area of that beam. The beams 510-513 (and coverage areas thereof) collectively form a cell 500.

In some examples, frequency reuse can be implemented to improve energy efficiency of the beams 510-513. In frequency reuse, two or more different beams can transmit and/or receive data using a same frequency resource or a same frequency band. For example, the beams 510 and 512 can use one frequency resource or frequency band. The beams 511 and 513 can use another frequency resource or frequency band.

Figure 6:
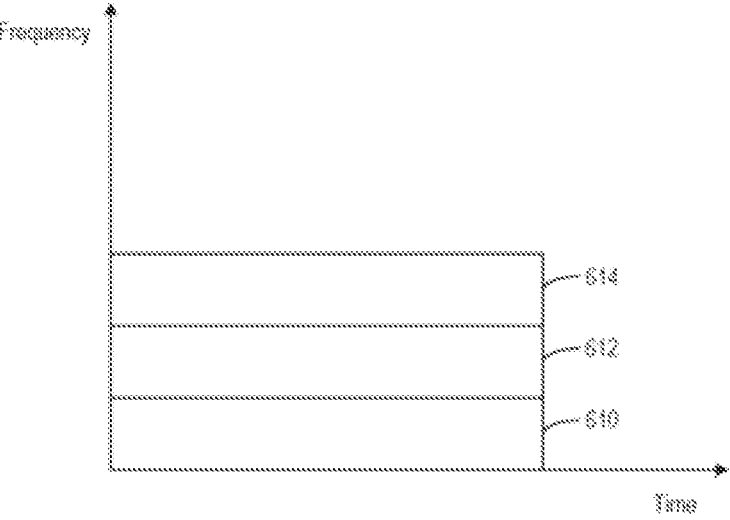
FIG. 6 is a diagram illustrating frequency resources used by the beams of the satellite (FIG. 5), according to various arrangements.

FIG. 6 is a diagram illustrating frequency resources used by the beams 510-513 of the satellite 501 (FIG. 5), according to various arrangements. Referring to FIGS. 5 and 6, the frequency resources used by the beams 510-513 are shown on a diagram in which the y-axis corresponds to frequency and the x-axis corresponds to time. The frequency resources include frequency resources 610, 612, and 614. Each of the frequency resources 610, 612, and 614 corresponds to a frequency bandwidth or a BWP. The satellite 501 transmits PBCHs of all of the beams 510-513 using a common frequency resource, e.g., the frequency resource 610. The beams 510 and 512 use (are transmitted on) the frequency resource 612. The beams 511 and 513 use (are transmitted on) the frequency resource 614.

In the deployment shown in FIGS. 5 and 6, an OOC code with a length of 4 can be used to distinguish the beams 510-513. Given that the cell has the 4 beams 510-513, a length-4 OCC is used in view of energy leak. A beam-specific length-4 OCC corresponds to each of the beams 510-513. 4 consecutive identical 1-ms PBCH subframes are received by the UE from the satellite 501.

In some examples, the OCC code can be determined using a Discrete Fourier Transform (DFT) matrix. An example of such DFT matrix is shown below:

$$\begin{bmatrix} 1 & 1 & 1 & 1 \\ 1 & \exp\left(-j\frac{2\pi}{4}\right) & \exp\left(-j\frac{2\pi \cdot 2}{4}\right) & \exp\left(-j\frac{2\pi \cdot 3}{4}\right) \\ 1 & \exp\left(-j\frac{2\pi \cdot 2}{4}\right) & \exp\left(-j\frac{2\pi \cdot 2 \cdot 2}{4}\right) & \exp\left(-j\frac{2\pi \cdot 2 \cdot 3}{4}\right) \\ 1 & \exp\left(-j\frac{2\pi \cdot 3}{4}\right) & \exp\left(-j\frac{2\pi \cdot 3 \cdot 2}{4}\right) & \exp\left(-j\frac{2\pi \cdot 3 \cdot 3}{4}\right) \end{bmatrix}. \tag{5}$$

The UE, in response to receiving the consecutive identical 1-ms PBCHs (each in a subframe of a sub-period), combines the consecutive identical 1-ms PBCHs with all possible beam-specific OCCs (4 beam-specific OCCs determined using the DFT matrix in the deployment shown in FIGS. 5 and 6). For example, the UE can combine the 4 consecutive identical 1-ms PBCH subframes with each beam-specific OCC corresponding to a different beam index through multiplication. In one example, a first-received PBCH (of the 4 identical PBCHs, in the earlier sub-period) is multiplied with a first element of a length-4 beam-specific OCC, a second-received PBCH (of the 8 identical PBCHs, in the second earliest sub-period) is multiplied with a second element of the length-4 beam-specific OCC, a third-received PBCH (of the 4 identical PBCHs, in the third earliest sub-period) is multiplied with a third element of the length-4 beam-specific OCC, and a fourth-received PBCH (of the 4 identical PBCHs, in the fourth earliest sub-period) is multiplied with a last element of the length-4 beam-specific OCC.

The resultant measurement corresponding to each beam-specific OCC (e.g., the resulting RSRP of each beam as measured, if higher than a detectable threshold), is used by the UE to determine a serving beam and one or more neighboring beams. The resultant measurement can be reported to the satellite 501 to facilitate possible beam switching. In some examples, the number of neighboring beams to be reported can be indicated by the satellite 501 via UE-specific signaling, UE group signaling, or broadcast.

The UE can report the measurements of the number of neighboring beams to the satellite 501.

In some arrangements, a length N of the beam-specific OCC can be determined according to a number of neighboring beams to be measured. In the example shown in FIG. 5 in which 4 total beams and 3 neighboring beams are deployed, N needs to be sufficiently large (e.g., 4, which is $2^2$) for distinguishing the different beams without creating waste (e.g., 8, which is $2^3$ would be too large to cover 4 neighboring beams). The number of neighboring beams to be measured can be set according to practical deployment configurations. In other words, the number of neighboring beams to be measured can be predefined. The satellite 501 can indicate or information the value of N to the UEs via PBCH. Given that the OCC combination over the consecutive identical PBCH subframes depends on successful decoding of the PBCH subframes, the value of N can be available after successful decoding of a single PBCH subframe. The OCC codes or the generation method thereof can be predefined and known by the non-terrestrial BS and UEs in advance. Accordingly, in response to determining the length N of the beam-specific OCC by decoding a single PBCH subframe, the UE can generate the OCC codes having the length N according to any suitable predetermined or predefined method (e.g., based on the DFT matrix).

Figure 7:
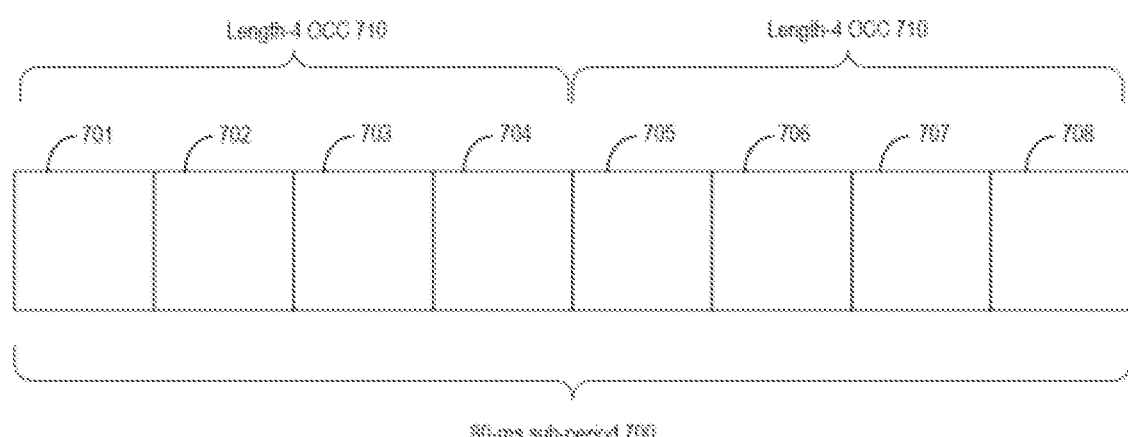
FIG. 7 is a diagram illustrating an application of an OCC in a sub-period, according to various arrangements.

In some examples, each element of a beam specific OCC is multiplied to a corresponding 1-ms PBCH subframe as shown in FIG. 7. FIG. 7 is a diagram illustrating an application of an OCC (e.g., a length-4 OCC 710) in a sub-period 700, according to various arrangements. Referring to FIGS. 5-7, an example of the length-4 OCC 710 is a length-4 OCC code obtained using the DFT matrix. The sub-period 700 includes 8 frames (frames 701, 702, 703, 704, 705, 706, 707, and 708) of 10 ms each. Each frame includes 10 subframes of 1 ms. In the sub-period 700, an identical PBCH (e.g., having a length of 1 ms) is transmitted in subframe #0 of each of the frame 701-708. As shown, the length-4 OCC 710 is applied to the identical PBCH repetitions the frames 701-704, and the length-4 OCC 710 is applied again to the identical PBCH repetitions the frames 705-708.

FIG. 8A is a flowchart diagram illustrating an example wireless communication method 800a for indicating beam-specific broadcast information, according to various arrangements. Referring to FIGS. 1-8A, the method 800a can be performed by a BS (e.g., a non-terrestrial BS). The method 800a is concerned with using OCC codes in PBCH repetition, which provides beam indication.

At 810a, the BS applies code sequences (e.g., OCC codes) to repetitions of broadcast information of a plurality of resources of a cell of the BS. Each of the OCC codes is specific to a corresponding one of the plurality of resources, thus the OCC codes are beam-specific codes. Each of the resources is a beam as described herein. While the OCC codes are used throughout as an example of code sequences, other types of code sequences such as but not limited to, low correlated codes, can be implemented such that each code sequence is beam-specific. In some embodiments, the code sequences comprise at least one of the OCC codes or a low correlated codes.

In some examples, the repetitions of the broadcast information for each resource of the plurality of resources include a number of repetitions of PBCH (e.g., in a repetition period). The PBCH is identical in each repetition of the number of repetitions. In some examples, each of the OCC codes has a length that is no more than the number of repetitions of the PBCH. That is, an OCC code with a length no more than the number of consecutive identical PBCH subframes can be applied to distinguish beams.

In some examples, the BS applies the OCC codes to the repetitions of the broadcast information includes combining the repetitions of the PBCH for each resource of the plurality of resources with a corresponding one of the OCC codes that is specific to each resource.

In some examples, combining the repetitions of the PBCH for each resource of the plurality of resources with the corresponding one of the OCC codes includes multiplying each repetition of the repetitions of the PBCH for each resource with a corresponding element of the corresponding one of the OCC codes in response to determining that a length of the OCC codes equals to the repetition number of PBCH.

In some examples, combining the repetitions of the PBCH for each resource of the plurality of resources with the corresponding one of the OCC codes includes applying the OCC codes to a predetermined portion of the repetitions of the PBCH in response to determining that the length of the OCC codes is less than the repetition number of PBCH, wherein the portion of the repetitions of the PBCH is predetermined. For example, relative to FIG. 4 in which 7 OCC codes (e.g., the length-7 OCC 410) are used to distinguish 7 beam, the BS applies the OCC codes to only a portion (e.g., the repetitions in the frames 402-408) of the repetitions of PBCH. A portion refers to some but not all of the repetitions. In some examples, the portion is predetermined and known by both the BS and UE in advance. Thus, the BS can apply the OCC code to the known portions (e.g., the known frames and subframes) of the sub-period 400 during transmission, and the UE can use the OCC in those known portions upon reception.

In some arrangements, the OCC codes are generated from a Hadamard matrix. In some arrangements, the OCC codes corresponds to a ZC sequence set. The ZC sequence set includes resource-specific ZC sequence corresponding to the plurality of resources. The ZC sequence set is determined using a cell-specific ZC root and a resource-specific cyclic shift. In some arrangements, the OCC codes are generated from a DFT matrix.

At 820a, the BS transmits to a UE the repetitions of the broadcast information with the OCC codes applied.

In some arrangements, the BS transmits to the UE a parameter corresponding to a number of neighboring resources $N_{neighboring\_resources}$ (or a number of neighboring beams $N_{neighboring\_beams}$) of the cell to be measured. The BS receives from the UE measurements for the number of neighboring resources. The measurements are performed by the UE using the resource-specific OCC codes.

In some arrangements, the BS transmits to the UE a length of the OCC codes. The UE determines a maximum value of the number of neighboring resources $N_{neighboring\_resources}$ based on the length of the OCC codes. In the example in which the BS transmits to the UE a length of 7 for the OCC codes, 1 of those OCC codes is for the serving beam and 6 for the neighboring beams. Thus, the number of neighboring resources $N_{neighboring\_resources}$ is implicitly indicated, without the BS actually indicating the parameter $N_{neighboring\_resources}$ that explicitly indicates the number of neighboring resources, thus saving signaling overhead and improving efficiency. In other words, the maximum value of the number of neighboring beams to be measured and reported can be determined from the length of the OCC obtained from the BS.

FIG. 8B is a flowchart diagram illustrating an example wireless communication method 800b for indicating beam-specific broadcast information, according to various arrangements. Referring to FIGS. 1-8B, the method 800b can be performed by a UE and corresponds to the operations performed by the BS in the method 800a. The method 800b is concerned with using OCC codes in PBCH repetition, which provides beam indication.

At 810b, the UE receives from the BS repetitions of broadcast information of a plurality of resources of a cell of the BS with code sequences (e.g., OCC codes) applied. Each of the OCC codes is specific to a corresponding one of the plurality of resources. While the OCC codes are used throughout as an example of code sequences, other types of code sequences such as but not limited to, low correlated codes, can be implemented such that each code sequence is beam-specific. In some embodiments, the code sequences comprise at least one of the OCC codes or a low correlated codes.

In some examples, the repetitions of the broadcast information for each resource of the plurality of resources include a number of repetitions of PBCH (e.g., in a repetition period). The PBCH is identical in each repetition of the number of repetitions. In some examples, each of the OCC codes has a length that is no more than the number of repetitions of the PBCH. That is, an OCC code with a length no more than the number of consecutive identical PBCH subframes can be applied to distinguish beams.

At 820b, the UE determines measurements for each of the plurality of resources distinguished using the OCC codes.

In some examples, the method 800b further includes the UE receiving, from the BS, a parameter corresponding to a number of neighboring resources $N_{neighboring\_resources}$ of the cell to be measured. The UE determining the measurements for each of the neighboring resources distinguished using the OCC codes includes determining measurements for the number of neighboring resources using the resource-specific OCC codes. The UE reports to the BS the measurements for the number of the neighboring resources.

In some examples, the method 800b further includes determining, by the UE, a maximum value of a number of the neighboring resources $N_{neighboring\_resources}$ of the cell based on a length of the OCC codes received from the BS. In the example in which the UE receives from the BS a length of 7 for the OCC codes, 1 of those OCC codes is for the serving beam and 6 for the neighboring beams. Thus, the number of neighboring resources $N_{neighboring\_resources}$ is implicitly indicated, without the BS actually indicating the parameter $N_{neighboring\_resources}$ that explicitly indicates the number of neighboring resources, thus saving signaling overhead and improving efficiency. In other words, the maximum value of the number of neighboring beams to be measured and reported can be determined from the length of the OCC obtained from the BS.

In some arrangements, beam-specific scrambling can be implemented with PBCH repetition.

In some examples, the non-terrestrial BS transmits PBCH with a period having a length (e.g., 640 ms). Each period includes a number of sub-periods. In the example in which the period is 640 ms long and has 8 sub-periods, each sub-period has a length of 80 ms. In each sub-period, an identical PBCH (e.g., having a length of 1 ms) is transmitted in a particular subframe (e.g., subframe #0) of each radio frame. A Master Information Block (MIB) is coded into a number of bits (e.g., 1600 bits) and divided into a number of portions (e.g., 8 parts, where each part is 200 bits). The scrambling code applied on each 200-bit part is different from the scrambling code applied to another one of the 200-bit parts. Each 1-ms PBCH contains a 200-bit part of the MIB. In a sub-period of 80 ms, the same 200-bit part of the MIB is transmitted in 8 consecutive subframe #0 of each radio frame. The 80-ms boundary is determined by the UE using a scrambling code test.

In some arrangements, in conventional NB IoT specifications, the 1600-bit scrambling sequence can be initialized using a scrambling code initialization value $c_{init}$ is initialized using:

$$c_{init} = N_{ID}^{Ncell},\tag{6}$$

where $$N_{ID}^{cell}$$

is a cell identifier identifying the cell/BS. Radio frames for which $c_{init}$ is initialized include those radio frames $n_f$ that satisfy:

$$n_f \bmod 64 = 0.\tag{7}$$

Modifying the conventional determination, and taking the cell 100 with the 7 beams 110-116 as shown in FIG. 1 for example, a scrambling code initialization value $c_{init}$ can be designed to integrate a beam ID, and can be determined using the example expression:

$$c_{init} = \left(\max\left(N_{ID}^{cell}\right) + 1\right) + M \cdot N_{ID}^{Ncell} + N_{ID}^{beam},\tag{8}$$

where M is a beam interval value, $$N_{ID}^{Ncell}$$

is a cell identifier, and $$N_{ID}^{beam}$$

is a beam identifier.

$$N_{ID}^{beam}$$

identifies multiple beams (e.g., the beams 110-116) of the cell 100 (identified by $$N_{ID}^{cell}).$$

In some examples, M can be predefined. In some example, M is predefined to be 8 for the 7 beams 110-116. The value M can be specified and known by the BS and the UEs in advance.

Using expression (8), examples of cell-and-beam-specific scrambling code initialization values are shown below, to be applied in radio frames that satisfy expression (7):

For cell 0, beam 0, $$c_{init} = \max(N_{ID}^{Ncell}) + M \cdot N_{ID}^{Ncell} + N_{ID}^{beam} = (503 + 1) + 8 \times 0 + 0 = 504.$$

For cell 0, beam 1, $$c_{init} = \max(N_{ID}^{Ncell}) + M \cdot N_{ID}^{Ncell} + N_{ID}^{beam} = (503 + 1) + 8 \times 0 + 1 = 505.$$

. . .

For cell 0, beam 6, $$c_{init} = \max(N_{ID}^{Ncell}) + M \cdot N_{ID}^{Ncell} + N_{ID}^{beam} = (503 + 1) + 8 \times 0 + 6 = 510.$$

For cell 1, beam 0, $$c_{init} = \max(N_{ID}^{Ncell}) + M \cdot N_{ID}^{Ncell} + N_{ID}^{beam} = (503 + 1) + 8 \times 1 + 0 = 512.$$

For cell 1, beam 1, $$c_{init} = \max(N_{ID}^{Ncell}) + M \cdot N_{ID}^{Ncell} + N_{ID}^{beam} = (503 + 1) + 8 \times 1 + 1 = 513.$$

. . .

For cell 1, beam 6, $$c_{init} = \max(N_{ID}^{Ncell}) + M \cdot N_{ID}^{Ncell} + N_{ID}^{beam} = (503 + 1) + 8 \times 1 + 6 = 518.$$

. . .

Given that conventionally, 503 total cell-specific scrambling code initialization values count had been defined, the cell-and-beam-specific scrambling code initialization values start from 504 to avoid overlap.

At the UE side, the UE obtains the cell ID $$N_{ID}^{Ncell}$$

after successfully detecting PSS/SSS. Then, the UE can use M possible scrambling codes, each determined based on one of the cell-and-beam-specific scrambling code initialization values corresponding to the cell ID (e.g., as shown above) to determine the serving beam. In other words, the UE blind checks each cell-and-beam-specific scrambling code (e.g., for cell ID being 0, each cell-and-beam-specific scrambling code determined using one of the cell-and-beam-specific scrambling code initialization values 504-510) to determine the serving beam. The measurement of neighboring beams can be obtained by a Successive Interference Cancellation (SIC) receiver.

In some arrangements, to reduce the UE blind de-scrambling time, the cell-and-beam-specific scrambling code initialization values can be applied to only a portion of the 1-ms PBCH in a 80 ms sub-period. An example is illustrated in FIG. 9, which is a diagram illustrating an application of cell-and-beam-specific scrambling code initialization values in a sub-period 900, according to various arrangements. Referring to FIG. 9, the sub-period 900 includes 9 frames (frames 901, 902, 903, 904, 905, 906, 907, and 908) of 10 ms each. Each frame includes 10 subframes of 1 ms. Each of the frames 901-908 includes a PBCH transmission. A cell-and-beam-specific scrambling code initialization value is applied only in the last 1-ms PBCH transmission (in the frame 908) of the 80-ms sub-period 900. For each of the first 7 1-ms PBCH transmissions each in a respective one of the frames 901-907, a cell-specific scrambling code initialization value is used. Given that the first 7 1-ms PBCH can be decoded and blind de-scrambling only needs to be performed with the last frame 908, blind de-scrambling time can be significantly reduced.

Thus, the UE can successfully detect PBCH with cell-specific scrambling code with a large probability, and obtain the value M in expression (8) in MIB. Then the UE shall use the M possible scrambling codes corresponding to the initial values to determine the serving beam. The measurement of neighboring beams can be obtained by the SIC receiver.

Figures 10A, 10B:
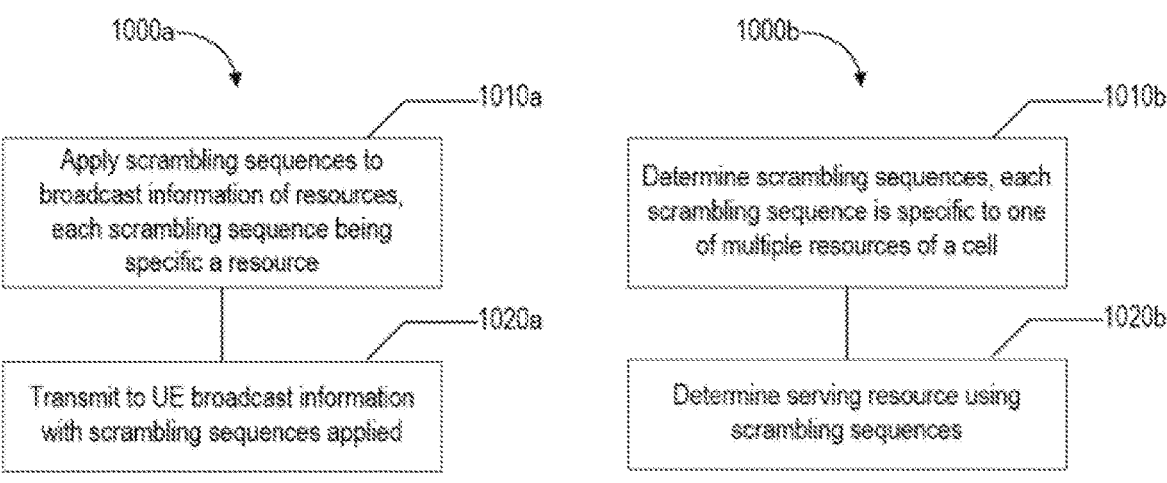
FIG. 10A is a flowchart diagram illustrating an example wireless communication method for indicating beam-specific broadcast information, according to various arrangements.
FIG. 10B is a flowchart diagram illustrating an example wireless communication method for indicating beam-specific broadcast information, according to various arrangements.

FIG. 10A is a flowchart diagram illustrating an example wireless communication method 1000a for indicating beam-specific broadcast information, according to various arrangements. Referring to FIGS. 12, 5, 6, 9, and 10A, the method 1000a can be performed by a BS. The method 1000a is concerned with using beam-specific scrambling in PBCH repetition, which provides beam indication.

At 1010a, the BS applies scrambling sequences to broadcast information of a plurality of resources of a cell of the BS. Each of the scrambling sequences is specific to a resource of the plurality of resources.

In some examples, the broadcast information for each resource of the plurality of resources include a number of repetitions of PBCH (e.g., in a repetition period). The PBCH is identical in each repetition of the number of repetitions. Each of the resources is a beam as described herein.

In some arrangements, the method 1000a further includes determining each of the scrambling sequences using a scrambling code initialization value specific to the resource. The scrambling code initialization value is determined based on at least a resource ID and a cell ID. The cell ID identifies the BS. The resource ID identifies one of the plurality of resources.

In some arrangements, applying the resource-specific scrambling sequences to the broadcast information includes applying the resource-specific scrambling sequences to at least one first repetition of the repetitions of the PB CH. The at least one first repetition is predetermined and known by both the UE and the BS in advance. The other repetitions (e.g., second repetitions) can apply conventional cell-specific scrambling codes.

In some examples, the BS applies resource-specific scrambling sequences to a predetermined portion of the repetitions of the PBCH. The predetermined portion of the repetitions of the PBCH includes at least one repetition of the repetitions of the PBCH.

In some examples, the BS transmitting an Information Element (IE) indicative of a scrambling code initialization value interval parameter (e.g., the beam interval parameter M) used to determine a scrambling code initialization value specific to each resource of the plurality of resources.

At 1020a, the BS transmits to the UE the broadcast information with the scrambling sequences applied.

FIG. 10B is a flowchart diagram illustrating an example wireless communication method 1000b for indicating beam-specific broadcast information, according to various arrangements. Referring to FIGS. 12, 5, 6, 9, 10A, and 10B, the method 1000*b* can be performed by a UE and corresponds to the operations performed by the BS in the method 1000*a*. The method 1000*b* is concerned with using beam-specific scrambling in PBCH repetition, which provides beam indication.

At 1010*b*, the UE determines scrambling sequences. Each of the scrambling sequences is specific to a resource of a plurality of resources of a cell of a BS. At 1020*b*, the UE determines a serving resource using the scrambling sequences.

In some examples, determining the serving resource using the scrambling sequences includes applying beam-specific scrambling sequences to a predetermined portion of repetitions of PBCH. The predetermined portion of the repetitions of the PBCH includes at least one repetition of the repetitions of the PBCH.

In some examples, the method 1000*b* further includes receiving an IE indicative of a scrambling code initialization value interval parameter (e.g., the beam interval parameter M) used to determine a scrambling code initialization value specific to each resource of the plurality of resources.

Figure 11A:
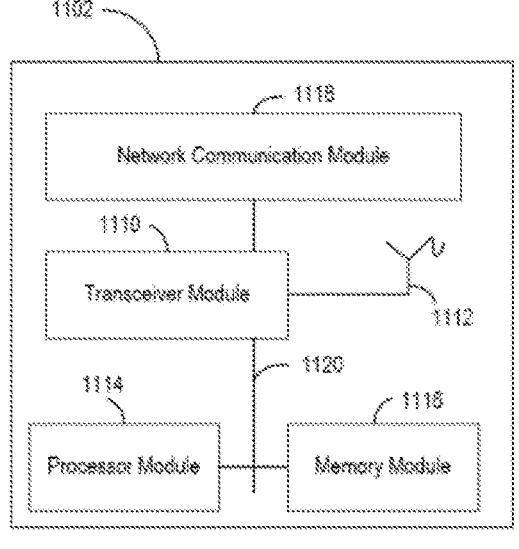
FIG. 11A illustrates a block diagram of an example BS, according to various arrangements.
Figure 11B:
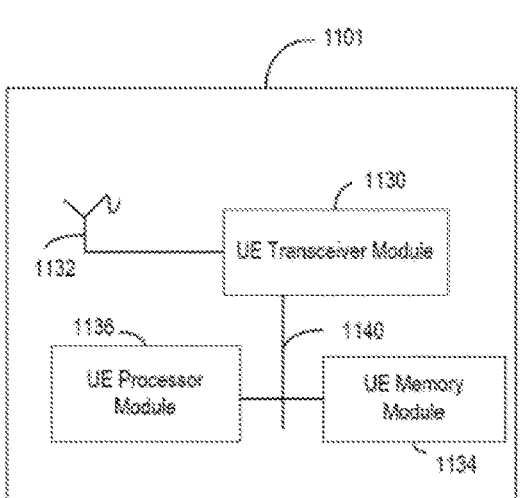
FIG. 11B illustrates a block diagram of an example UE, according to various arrangements.

FIG. 11A illustrates a block diagram of an example BS 1102 (e.g., a non-terrestrial BS described herein), in accordance with some embodiments of the present disclosure. FIG. 11B illustrates a block diagram of an example UE 1101, in accordance with some embodiments of the present disclosure. Referring to FIGS. 1-11B, the UE 1101 (e.g., a wireless communication device, a terminal, a mobile device, a mobile user, and so on) is an example implementation of the UEs described herein, and the BS 1102 is an example implementation of the BS described herein.

The BS 1102 and the UE 1101 can include components and elements configured to support known or conventional operating features that need not be described in detail herein. In one illustrative embodiment, the BS 1102 and the UE 1101 can be used to communicate (e.g., transmit and receive) data symbols in a wireless communication environment, as described above. For instance, the BS 1102 can be a BS (e.g., gNB, eNB, and so on), a server, a node, or any suitable computing device used to implement various network functions.

The BS 1102 includes a transceiver module 1110, an antenna 1112, a processor module 1114, a memory module 1116, and a network communication module 1118. The module 1110, 1112, 1114, 1116, and 1118 are operatively coupled to and interconnected with one another via a data communication bus 1120. The UE 1101 includes a UE transceiver module 1130, a UE antenna 1132, a UE memory module 1134, and a UE processor module 1136. The modules 1130, 1132, 1134, and 1136 are operatively coupled to and interconnected with one another via a data communication bus 1140. The BS 1102 communicates with the UE 1101 or another BS via a communication channel, which can be any wireless channel or other medium suitable for transmission of data as described herein.

As would be understood by persons of ordinary skill in the art, the BS 1102 and the UE 1101 can further include any number of modules other than the modules shown in FIGS. 11A and 11B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 1130 includes a radio frequency (RF) transmitter and a RF receiver each including circuitry that is coupled to the antenna 1132. A duplex switch (not shown) may alternatively couple the RF transmitter or receiver to the antenna in time duplex fashion. Similarly, in accordance with some embodiments, the transceiver 1110 includes an RF transmitter and a RF receiver each having circuitry that is coupled to the antenna 1112 or the antenna of another BS. A duplex switch may alternatively couple the RF transmitter or receiver to the antenna 1112 in time duplex fashion. The operations of the two-transceiver modules 1110 and 1130 can be coordinated in time such that the receiver circuitry is coupled to the antenna 1132 for reception of transmissions over a wireless transmission link at the same time that the transmitter is coupled to the antenna 1112. In some embodiments, there is close time synchronization with a minimal guard time between changes in duplex direction.

The UE transceiver 1130 and the transceiver 1110 are configured to communicate via the wireless data communication link, and cooperate with a suitably configured RF antenna arrangement 1112/1132 that can support a particular wireless communication protocol and modulation scheme. In some illustrative embodiments, the UE transceiver 1110 and the transceiver 1110 are configured to support industry standards such as the Long Term Evolution (LTE) and emerging 5G standards, and the like. It is understood, however, that the present disclosure is not necessarily limited in application to a particular standard and associated protocols. Rather, the UE transceiver 1130 and the BS transceiver 1110 may be configured to support alternate, or additional, wireless data communication protocols, including future standards or variations thereof.

The transceiver 1110 and the transceiver of another BS (such as but not limited to, the transceiver 1110) are configured to communicate via a wireless data communication link, and cooperate with a suitably configured RF antenna arrangement that can support a particular wireless communication protocol and modulation scheme. In some illustrative embodiments, the transceiver 1110 and the transceiver of another BS are configured to support industry standards such as the LTE and emerging 5G standards, and the like. It is understood, however, that the present disclosure is not necessarily limited in application to a particular standard and associated protocols. Rather, the transceiver 1110 and the transceiver of another BS may be configured to support alternate, or additional, wireless data communication protocols, including future standards or variations thereof.

In accordance with various embodiments, the BS 1102 may be a BS such as but not limited to, an eNB, a serving eNB, a target eNB, a femto station, or a pico station, for example. The BS 1102 can be an RN, a regular, a DeNB, or a gNB. In some embodiments, the UE 1101 may be embodied in various types of user devices such as a mobile phone, a smart phone, a personal digital assistant (PDA), tablet, laptop computer, wearable computing device, etc. The processor modules 1114 and 1136 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 1114 and 1136, respectively, or in any practical combination thereof. The memory modules 1116 and 1134 may be realized as RAM memory, flash memory, ROM memory, EPROM memory, EEPROM memory, registers, a hard disk, a removable disk, a CD-ROM, or any other form of storage medium known in the art. In this regard, memory modules 1116 and 1134 may be coupled to the processor modules 1110 and 1130, respectively, such that the processors modules 1110 and 1130 can read information from, and write information to, memory modules 1116 and 1134, respectively. The memory modules 1116 and 1134 may also be integrated into their respective processor modules 1110 and 1130. In some embodiments, the memory modules 1116 and 1134 may each include a cache memory for storing temporary variables or other intermediate information during execution of instructions to be executed by processor modules 1110 and 1130, respectively. Memory modules 1116 and 1134 may also each include non-volatile memory for storing instructions to be executed by the processor modules 1110 and 1130, respectively.

The network communication module 1118 generally represents the hardware, software, firmware, processing logic, and/or other components of the BS 1102 that enable bidirectional communication between the transceiver 1110 and other network components and communication nodes in communication with the BS 1102. For example, the network communication module 1118 may be configured to support internet or WiMAX traffic. In a deployment, without limitation, the network communication module 1118 provides an 802.3 Ethernet interface such that the transceiver 1110 can communicate with a conventional Ethernet based computer network. In this manner, the network communication module 1118 may include a physical interface for connection to the computer network (e.g., Mobile Switching Center (MSC)). In some embodiments, the network communication module 1118 includes a fiber transport connection configured to connect the BS 1102 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
applying, by a base station, code sequences to repetitions of broadcast information of a plurality of resources of a cell of the base station, each of the code sequences being specific to a corresponding one of the plurality of resources;
transmitting, by the base station to a wireless communication device, the repetitions of the broadcast information with the code sequences applied; and
receiving, by base station from the wireless communication device, measurements for a number of neighboring resources, wherein the measurements are performed by the wireless communication device using the resource-specific code sequence, wherein the number of neighboring resources of the cell to be measured is implicitly indicated by the base station to the wireless communication device via a length of one of the code sequences, the wireless communication device determines the number of neighboring resources based at least on the one of the code sequences.

2. The wireless communication method of claim 1, wherein
the repetitions of the broadcast information for each resource of the plurality of resources comprise a number of repetitions of Physical Broadcast Channel (PBCH); and
the PBCH is identical in each of the number of repetitions.

3. The wireless communication method of claim 1, wherein each of the plurality of resources is a beam of the cell.

4. The wireless communication method of claim 1, wherein the code sequences comprise at least one of Orthogonal Code Cover (OCC) codes or low correlated codes.

5. The wireless communication method of claim 4, wherein at least one of:
the OCC codes are generated from a Hadamard matrix;
the OCC codes corresponds to a Zadoff-Chu (ZC) sequence set, wherein the ZC sequence set comprises resource-specific ZC sequence corresponding to the plurality of resources; and the ZC sequence set is determined using a cell-specific ZC root and a resource-specific cyclic shift; or
the OCC codes are generated from a Discrete Fourier Transform (DFT) matrix.

6. The wireless communication method of claim 1, wherein each of the code sequence has a length that is no more than a number of repetitions of a Physical Broadcast Channel (PBCH).

7. The wireless communication method of claim 1, wherein
applying the code sequence to the repetitions of the broadcast information comprises combining the repetitions of a Physical Broadcast Channel (PBCH) for each resource of the plurality of resources with a corresponding one of the code sequence that is specific to each resource; and
combining the repetitions of the PBCH for each resource of the plurality of resources with the corresponding one of the code sequence comprises one of:
multiplying each repetition of the repetitions of the PBCH for each resource with a corresponding element of the corresponding one of the code sequence in response to determining that a length of the code sequence equals to the repetition number of PBCH; or
applying the code sequence to a predetermined portion of the repetitions of the PBCH in response to determining that the length of the code sequence is less than the repetition number of PBCH, wherein the portion of the repetitions of the PBCH is predetermined.

8. The wireless communication method of claim 1, further comprising:
transmitting, by the base station to the wireless communication device, a length of the code sequence, wherein the wireless communication device determines a maximum value of the number of neighboring resources based on the length of the code sequence.

9. A base station comprising:
at least one processor configured to:
apply code sequences to repetitions of broadcast information of a plurality of resources of a cell of the base station, each of the code sequences being specific to a corresponding one of the plurality of resources;

transmit, via a transmitter to a wireless communication device, the repetitions of the broadcast information with the code sequences applied; and receive, via a receiver from the wireless communication device, measurements for a number of neighboring resources, wherein the measurements are performed by the wireless communication device using the resource-specific code sequence, wherein the number of neighboring resources of the cell to be measured is implicitly indicated by the base station to the wireless communication device via a length of one of the code sequences, the wireless communication device determines the number of neighboring resources based at least on the one of the code sequences.

10. The base station of claim 9, wherein the repetitions of the broadcast information for each resource of the plurality of resources comprise a number of repetitions of Physical Broadcast Channel (PBCH); and the PBCH is identical in each repetition of the number of repetitions.

11. A wireless communication method, comprising:

receiving, by a wireless communication device from a base station, repetitions of broadcast information of a plurality of resources of a cell of the base station with code sequence applied, each of the code sequence being specific to a corresponding one of the plurality of resources;

determining, by the wireless communication device, measurements for each of the plurality of resources distinguished using the code sequences; and determining, by the wireless communication device, a parameter corresponding to a number of neighboring resources of the cell to be measured, wherein determining the measurements for each of the neighboring resources distinguished using the code sequence comprises determining measurements for the number of neighboring resources using the resource-specific code sequence, wherein the number of neighboring resources of the cell to be measured is implicitly indicated by the base station to the wireless communication device via a length of one of the code sequences, the wireless communication device determines the number of neighboring resources based at least on the one of the code sequences.

12. The method of claim 11, wherein the repetitions of the broadcast information for each resource of the plurality of resources comprise a number of repetitions of Physical Broadcast Channel (PBCH); and the PBCH is identical in each repetition of the number of repetitions.

13. The method of claim 11, wherein each of the plurality of resources is a beam of the cell.

14. The method of claim 11, wherein the code sequences comprise at least one of Orthogonal Code Cover (OCC) codes or low correlated codes.

15. The method of claim 11, further comprising:

reporting, by the wireless communication device to the base station, the measurements for the number of the neighboring resources.

16. The method of claim 11, further comprising determining, by the wireless communication device, a maximum value of the number of the neighboring resources of the cell based on a length of the code sequence received from the base station.

17. A wireless communication device, comprising:

at least one processor configured to:

receive, via a receiver from a base station, repetitions of broadcast information of a plurality of resources of a cell of the base station with code sequence applied, each of the code sequence being specific to a corresponding one of the plurality of resources;

determine measurements for each of the plurality of resources distinguished using the code sequences; and determine a parameter corresponding to a number of neighboring resources of the cell to be measured, wherein determining the measurements for each of the neighboring resources distinguished using the code sequence comprises determining measurements for the number of neighboring resources using the resource-specific code sequence, wherein the number of neighboring resources of the cell to be measured is implicitly indicated by the base station to the wireless communication device via a length of one of the code sequences, the wireless communication device determines the number of neighboring resources based at least on the one of the code sequences.

18. The wireless communication device of claim 17, wherein the repetitions of the broadcast information for each resource of the plurality of resources comprise a number of repetitions of Physical Broadcast Channel (PBCH); and the PBCH is identical in each repetition of the number of repetitions.

19. The wireless communication device of claim 17, wherein each of the plurality of resources is a beam of the cell.

* * * * *